(12) United States Patent
Heinrich

(10) Patent No.: US 7,360,705 B2
(45) Date of Patent: Apr. 22, 2008

(54) APPARATUS AND METHOD FOR READING MACHINE-READABLE SYMBOLS

(75) Inventor: Harley K. Heinrich, Everett, WA (US)

(73) Assignee: Intermec IP Corp., Everett, WA (US)

( * ) Notice: Subject to any disclaimer, the term of this patent is extended or adjusted under 35 U.S.C. 154(b) by 187 days.

(21) Appl. No.: 11/181,678

(22) Filed: Jul. 14, 2005

(65) Prior Publication Data
US 2007/0012781 A1   Jan. 18, 2007

(51) Int. Cl.
*G06K 7/10* (2006.01)

(52) U.S. Cl. .......................... 235/462.06; 235/462.42; 235/462.43

(58) Field of Classification Search .......... 235/462.06, 235/462.42, 462.43, 473
See application file for complete search history.

(56) References Cited

U.S. PATENT DOCUMENTS

| | | | |
|---|---|---|---|
| 4,720,824 A * | 1/1988 | Hayashi | 369/44.12 |
| 4,878,724 A * | 11/1989 | Thaniyavarn | 385/3 |
| 5,751,248 A * | 5/1998 | Thaniyavarn | 342/368 |
| 5,966,476 A * | 10/1999 | Hwang et al. | 385/3 |
| 6,123,263 A * | 9/2000 | Feng | 235/462.42 |
| 6,247,645 B1 * | 6/2001 | Harris et al. | 235/454 |
| 6,286,763 B1 | 9/2001 | Reynolds et al. | 235/472.01 |
| 6,542,672 B2 * | 4/2003 | Jewell et al. | 385/49 |
| 6,614,957 B2 * | 9/2003 | Wyeth et al. | 385/33 |
| 2005/0179962 A1 * | 8/2005 | Williamson | 358/473 |

* cited by examiner

*Primary Examiner*—Ahshik Kim
(74) *Attorney, Agent, or Firm*—Seed IP Law Group PLLC

(57) ABSTRACT

A reader for optically reading machine-readable symbols such as barcodes. The reader includes at least one light source for producing light and a number of light emitters for emitting the light from the reader according to a desired sequence. The distinct light emitters are coupled with the at least one light source through an illumination network comprising waveguides and optical switches. The emitted light is controlled by a control subsystem, which can include a microprocessor, a buffer, a bus, and a memory. The distinct light emitters are supported in a holder, which is coupled to a housing of the reader. A focusing device directs the light emitted from the distinct light emitters. An optical sensor coupled to the housing receives at least some of the light reflected from the symbol and can operate with the control subsystem to decode the reflected light.

35 Claims, 8 Drawing Sheets

APPARATUS AND METHOD FOR READING MACHINE-READABLE SYMBOLS

BACKGROUND OF THE INVENTION

1. Field of the Invention

This disclosure generally relates to the field of automatic data collection, and more particularly to machine-readable symbol readers operable to read machine-readable symbols, for example, bar code symbols.

2. Description of the Related Art

A variety of machine-readable symbol readers for reading machine-readable symbols are known. Symbol readers typically employ one of two fundamental approaches, scanning or imaging.

In scanning, a focused beam of light is scanned across the machine-readable symbol, and light reflected from and modulated by the machine-readable symbol is received by the reader and demodulated. With scanning type some readers, the machine-readable symbol is moved past the reader. With other scanning type readers, the reader is moved past the machine-readable symbol. Other scanning type readers move the beam of light across the machine-readable symbol while the reader and machine-readable symbol remain approximately fixed with respect to one another. Demodulation typically includes an analog-to-digital conversion and a decoding of the resulting digital signal.

In imaging, the machine-readable symbol reader may flood the machine-readable symbol with light, or may rely on ambient lighting. A one-dimensional (linear) or two-dimensional image capture device or imager such as a charge coupled device (CCD) array captures a digital image of the illuminated machine-readable symbol, typically by electronically sampling or scanning the pixels of the image capture device. The captured image is then decoded, typically without the need to perform an analog to digital conversion.

Scanning type readers typically employ a source of coherent, collimated light, for example a laser diode, to produce the beam. The scanning type reader may include a beam deflection system, for example a rotating or oscillating mirrors or prisms, to scan the resulting beam across the machine-readable symbol. To achieve high scan rates, the beam deflection systems must rotate or oscillate at very high frequencies. Such beam deflection systems are costly. Beam deflection systems also are prone to shock. Further, the use of moving parts in beam deflection systems, particularly parts that rotate or oscillate at high frequency, make such systems more susceptible to mechanical failure.

Imagers type readers are inherently more reliable than scanning type readers because they reduce or eliminate moving parts such as the rotating or oscillating mirrors or prisms. However, scanning type readers typically have a greater depth-of-field (i.e., range of distances between the symbol and the scanning type reader over which a symbol can be successfully decoded) than imaging type readers. An auto-focus mechanism may be added to the reader to enhance or improve the limited depth-of-field of the imaging type reader. The auto-focus mechanism typically includes a moveable optical element and either an active or passive range sensing subsystem. The range sensing subsystem causes the movement of the optical element to focus an image of the machine-readable symbol on the image sensor or imager. However, the addition of the movable optical element decreases the inherent reliability advantage that imaging type readers have over scanning type readers.

There is a need in the automatic data collection arts for a symbol reader that can overcome at least some of the aforementioned drawbacks.

SUMMARY

In one aspect, a machine-readable symbol reader for reading machine-readable symbols includes a housing; at least one transducer coupled to the housing and operable to produce light; an illumination network comprising a plurality of primary waveguides supported by the housing, each of the primary waveguides comprising a light receiving end and a light emitting end, the light receiving ends coupled to selectively receive light from the at least one transducer, the light emitting ends generally arranged along at least a first axis and positioned to selectively emit light from the housing; a control subsystem coupled to cause the light emitting ends to emit light in a desired emission sequence; a focusing lens to focus the emitted light; and an optical sensor positioned with respect to the light emitting ends to receive at least a portion of the light that is returned from a surface illuminated by the emitted light that is emitted from the light emitting ends.

In another aspect, a machine-readable symbol reader for reading machine-readable symbols includes at least one transducer operable to produce light; an illumination network comprising a plurality of primary waveguides, a number of intermediary waveguides, and a number of optical switches, each of the primary waveguides comprising a light receiving end and a light emitting end, the light receiving ends of the primary waveguides coupled by at least some of the intermediate waveguides and the optical switches to selectively receive light from the at least one transducer, the light emitting ends of the primary waveguides generally arranged along at least a first axis and positioned to selectively emit light in a first direction toward a surface to be illuminated; a control subsystem coupled to electrically control the number of optical switches to cause the light emitting ends to emit light in a desired emission sequence; a focusing lens to focus the emitted light; and at least one optical sensor positioned with respect to the light emitting ends to receive at least a portion of light returned from the illuminated surface.

In yet another aspect, a machine-readable symbol reader, includes light generating means for generating light; illumination network means comprising at least a light emitting means for emitting the light from the reader; the illumination network means for selectively routing light from the light generating means to the light emitting means; control means for controlling the illumination network means to cause the light emitting means to emit light in a controlled emission sequence along at least a first axis; and light detector means for detecting at least some of the emitted light reflected from a surface.

In yet another aspect, a method of operating a machine-readable symbol reader includes at least one transducer to produce light, a plurality of light emitters positioned to emit light from the machine-readable symbol reader, an illumination network comprising waveguides and optical switches to selectively direct light from the at least one transducer to the plurality of light emitters, and a control subsystem to control the illumination network, and wherein the method further includes providing control signals from the control subsystem to the optical switches to route light from the at least one transducer to the plurality of light emitters to cause the plurality of light emitters to emit light in a scanning sequence; and receiving at least a portion of the emitted light that is reflected from a surface.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figures 1A, 1B:
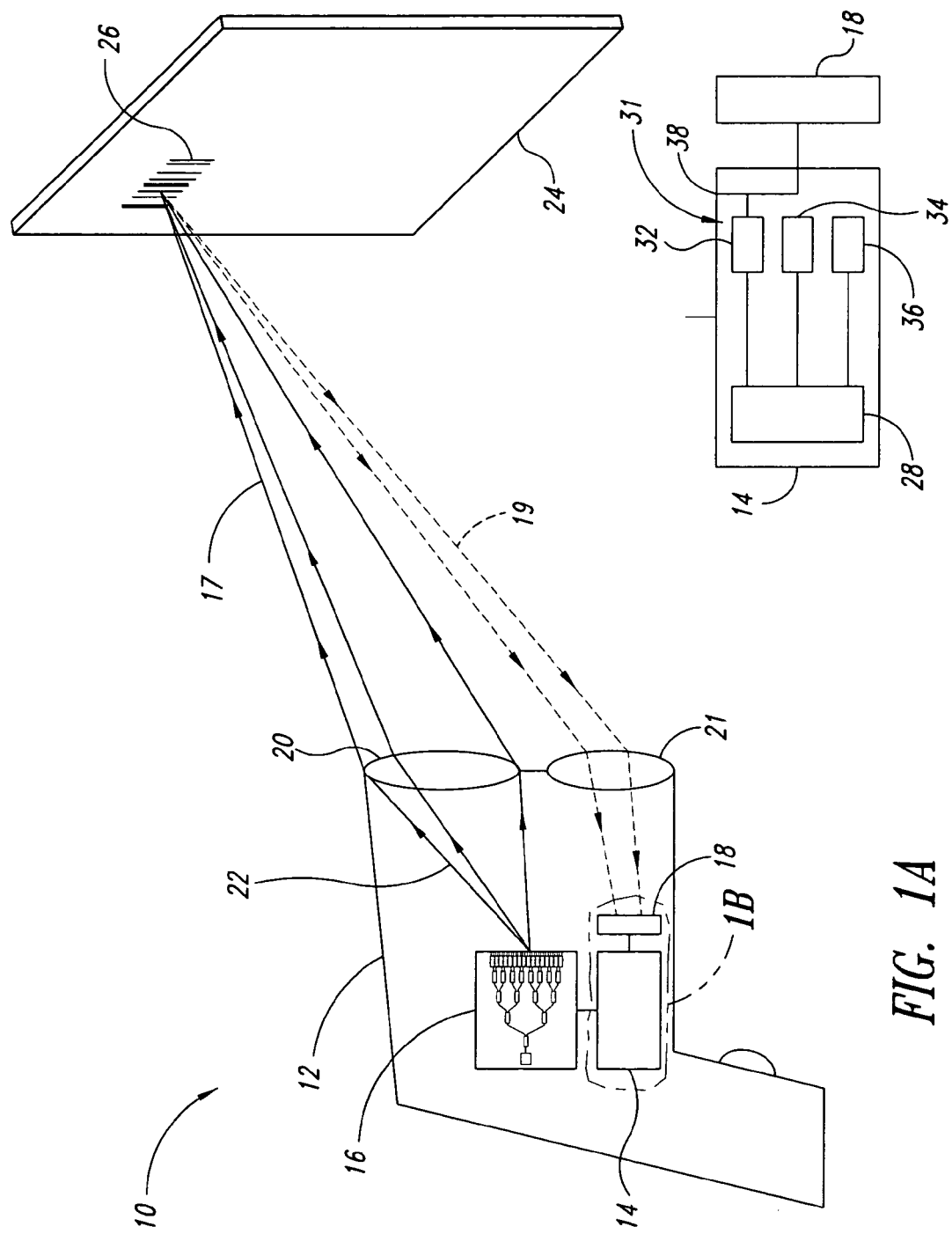
FIG. 1A is an isometric view of a machine-readable symbol reader according to one illustrated embodiment.
FIG. 1B is a detailed, schematic view of a control subsystem within the symbol reader of FIG. 1A, according to one illustrated embodiment.

In the following description, certain specific details are set forth in order to provide a thorough understanding of various embodiments. However, one skilled in the art will understand that the embodiments may be practiced without these details. In other instances, well-known structures associated with reading (i.e., scanning and/or imaging) types of machine-readable symbol readers have not been shown or described in detail to avoid unnecessarily obscuring descriptions of the embodiments. In addition, well-known structures associated with fiber optics (i.e., waveguide), fiber optic networks, including waveguide connections, data transmissions, efficiencies, line losses, and other network, structural and/or operational parameters may not necessarily be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

As used herein and in the claims, the term "waveguide" means any guide for the transmission of light, for example a fiber optic carrier. Waveguides are also commonly referred to in the art as fiber optic cables, optical fiber waveguides, and/or optical cables. The light can be a light wave, an optical signal, or some other form of generated light that may or may not also function as a data transmission signal.

As used herein and in the claims, the term "optical switch" refers to a coupling or splicing device to connect one waveguide to at least another waveguide. It should be understood and appreciated that at least one purpose of an "optical switch" is to switch incoming light from one waveguide to another waveguide in a controlled manner. The optical switch, as used herein, may be, but is not limited to any of the following devices: an optical coupler; an optical regenerator; an optical repeater; an optical modulator; an optical link (also referred to as a fiber optic link); an optical splitter (or simply a splitter); an optical detector; a fusion splice; a jumper cable; and/or a mechanical splice. In addition, the optical switch may include and/or incorporate other features such as an amplifier, a converter for converting the light to an electrical signal and then for converting the electrical signal back to light (optical->electrical->optical; OEO), photodiodes, laser diodes; light emitting diodes (LEDs), attenuators, micro-electro-mechanical systems (MEMS), lenses, heating or cooling elements, and/or other components for conditioning or otherwise manipulating light, optical signals, and/or electrical signals during transmission.

The following description relates generally to an optical reader in which light is transmitted in a controlled manner through an array of waveguides and optical switches. In one application, the optical reader can operate as a scanner to read and decode a machine-readable symbol, for example a barcode symbol. It is appreciated that the optical reader may be hand held or fix-mounted. In addition, the optical reader may be wireless and/or have accessory aspects or features, for example a connection port for connecting to and downloading data to a data collection system.

Machine-Readable Symbol Reader

FIG. 1A shows a machine-readable symbol reader 10 comprising a housing 12, a control subsystem 14, an illumination subsystem 16, an optical receiver/sensor 18, and a focusing device 20. The symbol reader 10 is depicted as a handheld unit for illustrative purposes only. The illustrated configuration of the symbol reader 10 is not meant to limit or otherwise narrow the scope of the claimed invention.

FIG. 1B shows the control subsystem 14 comprising a controller 28, one or more memories 31, and one or more buses 38 coupling the controller 28, the memories 31, the illumination subsystem 16, and the optical sensor 18 according to the illustrated embodiment. The controller 28 provides control signals over the bus 38 to operate the illumination subsystem 16, and processes signals received over the bus 38 from the optical sensor 18. The controller 28 can take a variety of forms, for example one or more microprocessors, Digital Signal Processors (DSPs), Field Programmable Gate Arrays (GPGAs), and/or Application-Specific Integrated Circuits (ASICs).

The memories may take a variety of forms, for example, one or more buffers 32, registers (not shown), random access memories (RAMs) 34, and/or read only memories (ROMs) 36. The buffer 32 may temporarily store data received from the optical sensor 18 until the controller 28 is ready to process the data. Typically, the ROM 36 will persistently store instructions and/or data executable by the controller 28. Typically, the RAM 34 will dynamically store instructions and/or data for use by the controller 28. An example of a controller that can be used with the symbol reader 10 is described in detail in U.S. Pat. No. 6,618,162 filed on Jan. 26, 1999.

The control subsystem 14 operates with the illumination subsystem 16 to controllably direct light 22 onto a surface 24. The light 17 emitted from the housing 12 can be focused into a light beam 17 with the focusing device 20. The optical sensor 18 receives at least some of the emitted light 19 reflected or returned from the surface 24. The emitted light 19 reflected from the surface 24 is focused onto the optical sensor 18 with a second lens 21. In particular, the reflected or returned light is modulated by a machine-readable symbol 26 (e.g., barcode symbol, area or matrix code symbol, or stacked symbol) located on the surface 24. The modulated light is processed by the control subsystem 14 to interpret information encoded in the machine-readable symbol 26.

Figure 2:
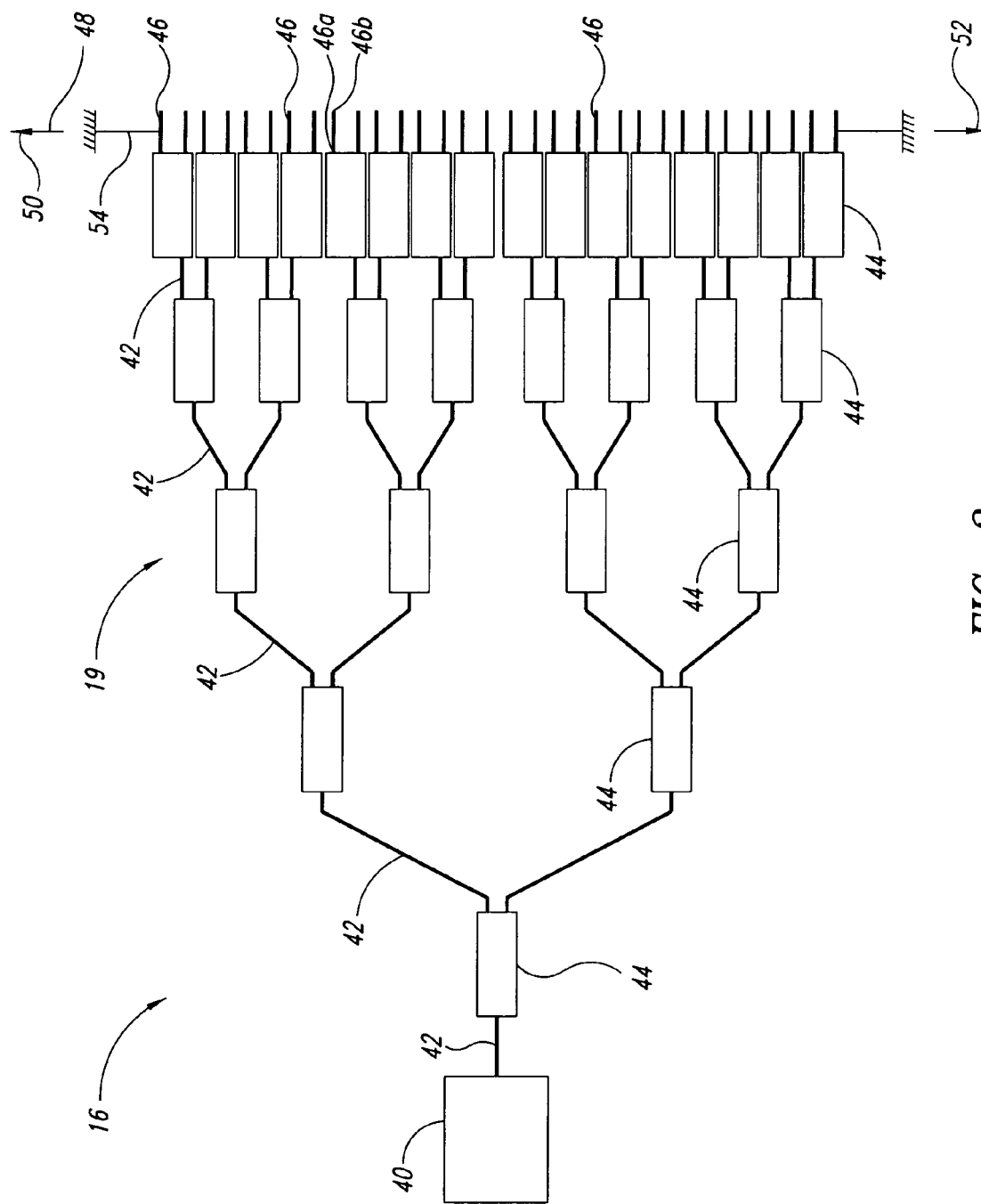
FIG. 2 is a schematic diagram of an illumination subsystem within the symbol reader of FIG. 1A, according to one illustrated embodiment.

FIG. 2 shows that the illumination subsystem 16 according to the illustrated embodiment. In this embodiment, the illumination subsystem 16 comprises at least one light source 40 and an illumination network 19. The illumination network 19 comprises a number of intermediate waveguides 42, a number of optical switches 44, and a number of primary waveguides 46.

The light source 40 acts as a transducer to generate the light 22. The light 22 is transmitted through the number of intermediate waveguides 42 and the number of optical switches 44 to the primary waveguides 46. The controller 14 operates to selectively route the light 22 through the illumination network 19 and may directly or indirectly control the emission of the light 22 from the primary waveguides 46.

The light source 40 may take the form of a source of coherent, amplified, collimated light, for example a laser light source, such as a semiconductor laser chip, a gas filled tube laser. In an alternate embodiment, the light source 40 is a light emitting diode (LED).

Lasers are typically employed for long distance optical reading (e.g., when the symbol 24 is more than a few inches from the focusing device 20 of the reader 10), while LEDs are typically employed for short-distance optical reading. It is further understood that lasers generally produce light within or near the infrared range of the electromagnetic spectrum, however for purposes herein, the light source, whether laser or LED generated, can operate in or emit light from another part of the electromagnetic spectrum. It is further appreciated that an aiming light (not shown) can be incorporated into the symbol reader 10 and can operate in conjunction with the light source 40. The aiming light produces light in the visible portion of the electromagnetic spectrum to allow a user to accurately "aim" the symbol reader 10 toward the machine-readable symbol 24.

It is understood and appreciated that the number of intermediate waveguides 42, optical switches 44, and primary waveguides 46, which taken together form the illumination network 19, can vary depending on the size and/or purpose of the symbol reader 10. For example, the number of primary waveguides may be increased to achieve a desired level of resolution or conversely, the number of primary waveguides 46 can be reduced to meet a minimum power requirement or to reduce operating complexity or cost of the symbol reader 10. For purposes of the embodiments illustrated herein, the number of primary waveguides 46 can range from one to any number greater than one.

Waveguides typically have a core through which the light 22 propagates surrounded by a cladding material, both of which are well known in the art. The core is typically made from transparent silica (i.e., glass) or a polymeric material (i.e., plastic). In one embodiment, the waveguides 42, 46 are made from a molecularly engineered electro-optic polymer that is commercially available from Lumera Corporation.

The length of the respective intermediate waveguides 42 may be customized to extend from one optical switch 44 to another optical switch 44 depending on an orientation of the illumination network 19 within the symbol reader 10, for example.

Figure 3A:
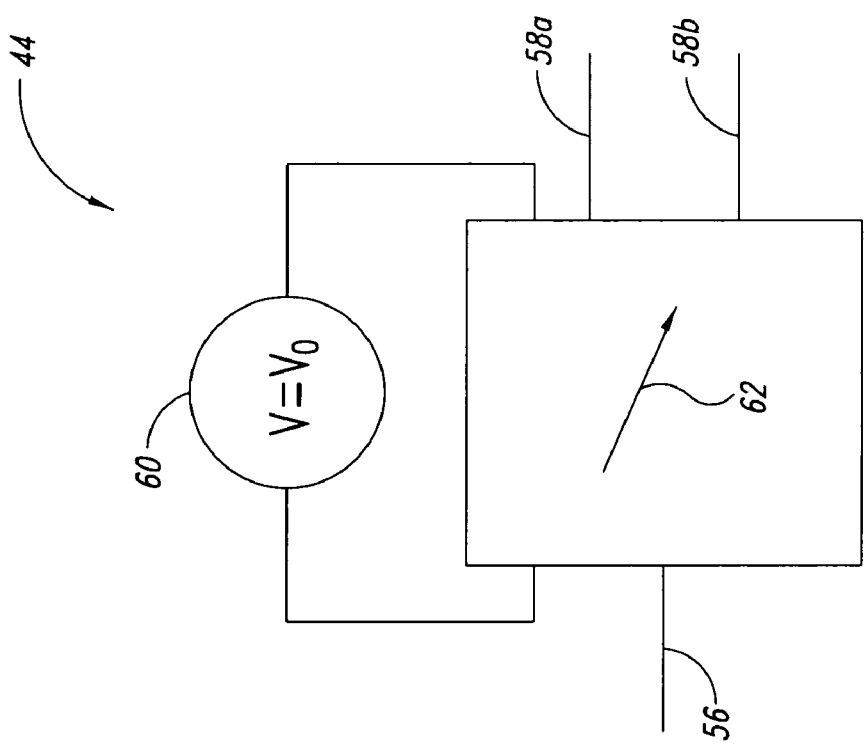
FIG. 3A is a schematic diagram of an optical switch with an applied voltage thereacross, according one illustrated embodiment.
Figure 3B:
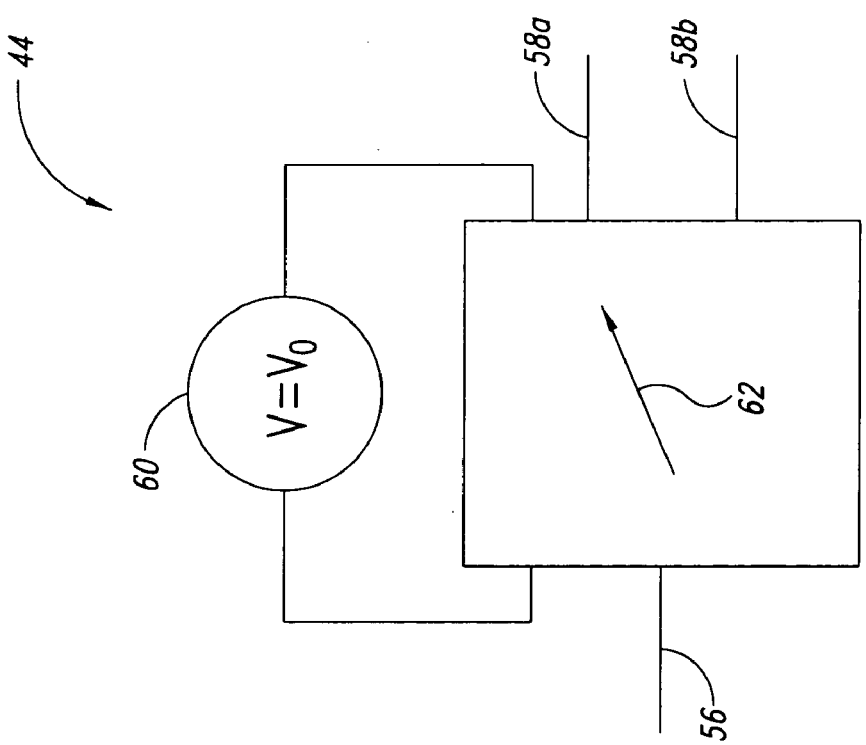
FIG. 3B is a schematic diagram of the optical switch of FIG. 3A with zero voltage applied thereacross.

Referring to FIGS. 2, 3A, and 3B, the optical switches 44 can be controlled to selectively direct the light 22 through the illumination network 19. The optical switch 44 generally has an input 56 and at least one output 58a and/or 58b. It is understood that the number of inputs 56 and the number of outputs 58 may vary depending on the particular design and desired function of the optical switch 44.

In FIGS. 3A and 3B, the optical switch 44 is a 1×2 (i.e., one input and two outputs) optical switch 44 having the input 56, the first output 58a, and the second output 58b according to the illustrated embodiment. A potential or voltage 60 is applied to the optical switch 44 to direct the light 22 to one of either the first output 58a or the second output 58b as indicated by the arrow 62.

In one embodiment, the controller 14 communicates with the optical switches 44 such that the optical switch 44 may operate according to one of three ways: (1) the optical switch 44 operates to transmit light to the first output 58a, as shown by arrow 60 in FIG. 3A; (2) the optical switch 44 operates to transmit light to the second output 58b, as shown by arrow 60 in FIG. 3B; or (3) the optical switch 44 operates to block the light from being transmitted through the optical switch 44 (i.e., the optical switch in this configuration is in a non-transmitting or OFF mode so that no light is received by either the first output 58a or the second output 58b).

Optical switches can be generally classified into the following categories: (1) opto-mechanical switches, which include a micro-electrical mechanical system (MEMS) switches; (2) thermo-optical switches; (3) liquid-crystal and liquid-crystals-in-polymer switches; (4) gel/oil-based "bubble" switches; (5) electro-holographic switches; and others switches such acousto-optic switches, semiconductor optical amplifiers (SOA), and ferromagnetic switches. The structure and operation of these optical switches are described in Amy Dugan et al., *The Optical Switching Spectrum: A Primer on Wavelength Switching Technologies*, Telecomm. Mag. <www.uta.edu/faculty/jcchiao/paper_download/2001_telecom_mag.pdf.> (May 2001); and Roland Lenz, *Introduction to All Optical Switching Technologies*, v.1, <www.2cool4u.ch/wdm_dwdm/intro_allopticalswitching/intro_allopticalswitching.htm#_Toc31771894> (Jan. 30, 2003).

However it is understood and appreciated that the optical switch 44 herein may operate according to any of the aforementioned principals or may operate according to different principals. In one exemplary embodiment, the optical switch 44 is an "Electroabsorption (EA) Optical Switch" developed by OKI® Optical Components Company. In another exemplary embodiment, the optical switch 44 is an "Efficient Linearized Semiconductor Optical Switch" (ELSOM) developed by TRW, Inc. In yet another exemplary embodiment, the optical switch 44 is a "Lithium Niobate ($LiNbO_3$) Optical Switch" developed by the Microelectronics Group of Lucent Technologies, Inc. In still yet another exemplary embodiment, the optical switch 44 is a discrete, electro-optical switch developed by Lumera Corporation. The optical switches 44 can include amplifiers or regenerators to condition the light 22, electrical signal, and/or optical signal.

Referring back to FIG. 2, the primary waveguides 46 are arranged generally along a first row or axis 48. The primary waveguides 46 each have a light receiving end 46a and a light emitting end 46b. The light receiving end 46a can be coupled to and receive light directly from the optical switch 44.

During operation of the reader 10, the controller 14 controllably activates/deactivates each light emitting end 46b of the primary waveguides 46 according to a desired emission sequence to produce a scanning light beam 17 according to one embodiment. The desired emission sequence will typically be in a sequential order, for example the light 22 is emitted from the respective primary waveguides 46 in a first direction 50, in a second direction 52, in the first direction 50 followed by the second direction 52, or vice-versa. The primary waveguides 46 can be supported in a holder 54. In addition, the holder 54 can be coupled to the housing 12 to keep the primary waveguides 46 in a relatively fixed relationship with respect to the housing 12.

FIGS. 4A-4D show several possible embodiments of the light emitting ends 46b of the primary waveguides 46 arranged in the holder 54. It is understood that the primary waveguides 46 can be arranged in the holder 54 and/or with respect to one another in a variety of ways.

Figure 4A:
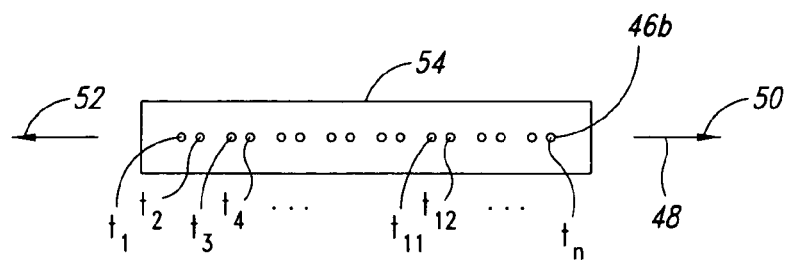
FIGS. 4A-4D are schematic diagrams of a holder having a plurality of distinct light emitters distributed therewith according to the various illustrated embodiments.

In FIG. 4A, the light emitting ends 46b of the primary waveguides 46 are distributed linearly in the holder 54 along the first axis 48 according to the illustrated embodiment. The light emitting ends 46b are labeled with identifiers $t_1$-$t_n$ to indicate that the light 22 is emitted according to the desired emission sequence, which may be a sequential sequence. For example, light 22 is emitted from each light emitting end 46b at discrete times along the first direction 50.

As discussed above, the control subsystem 14 provides control signals to cause at least some of the light emitting ends 46b to emit the light 22 at discrete times according to the desired emission sequence. Typically, the light 22 is emitted from each light emitting end 46b sequentially in the first direction 50 or the second direction 52 (e.g., in order from $t_1$ to $t_n$ or vice versa) to generate the light beam 17. Alternatively, the light 22 is emitted from each light emitting end 46b sequentially in the first direction 50 and then in the second direction 52 (i.e., reverse direction), or vice-versa. Thus at any discrete moment in time, at least one primary waveguides 46 can be in a light emitting state while the remaining primary waveguides 46 are in a non-light emitting state. It should be appreciated that the desired emission sequence permits the state of each respective primary waveguide 46 to change with time. The primary waveguides 46 may be switched in any order, including a random order. The order, once ascertained, could then be reconstructed by a processor. In one embodiment, the light emitting ends 46b of the primary waveguides 46 are switched in groups, for example in a predominantly bright light is emitted from a first primary waveguide 46 while a dimmer light is simultaneously emitted from a second, adjacent primary waveguide 46.

Figure 4B:
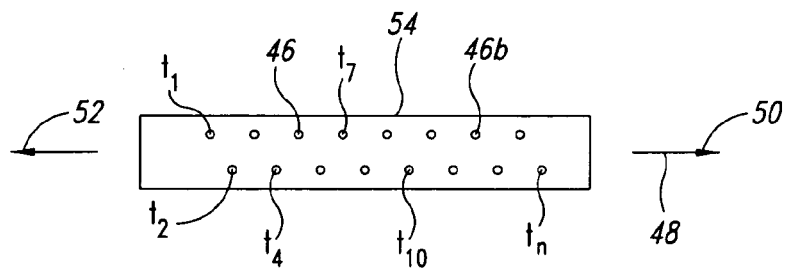

In FIG. 4B, the light emitting ends 46b of the primary waveguides 46 are distributed in the holder 54 generally along the first axis 48 according to the illustrated embodiment. The distribution of the light emitting ends 46b generally along the first axis 48 includes the light emitting ends 46b being slightly offset from the first axis 48, for example in a perpendicular direction from the first axis 48.

Figure 4C:
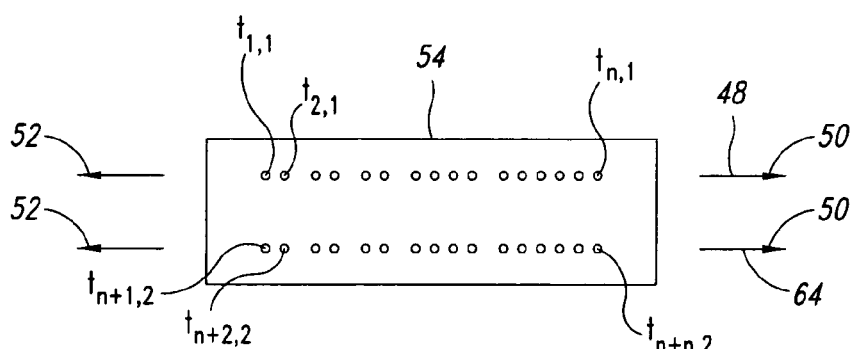

In FIG. 4C, the light emitting ends 46b are distributed in the holder 54 generally along the first axis 48 and a second axis 64, wherein the second axis 64 is generally parallel to the first axis 48 according to the illustrated embodiment. Although the light emitting ends 46b are shown as linearly distributed along the respective axes 48, 64, it is understood that the light emitting ends 46b can be generally distributed along each respective axis 48, 64, for example the light emitters 46b of the primary waveguides 46 may be perpendicularly offset from the respective axes 48, 64, as indicated by the exemplary embodiment of FIG. 4B.

The light 22 is emitted from the respective primary waveguides 46 in one of either the first direction 50 or the second direction 52 (e.g., in order from node $t_{1,1}$ to node $t_{n,1}$ or vice versa). In the illustrated embodiment, the first subscript represents the time that the primary waveguide 46 is in a light emitting state and the second subscript represents the row number in which the primary waveguide 46 is located (e.g., node $t_{n,1}$ means that at time "n," the last node in row 1 will be in the light emitting state). After the light 22 is emitted from each of the emitting ends 46b of the primary waveguides 46 along the first axis 48, then the light 22 can be emitted from the emitting ends 46b along the second axis 64 in one of either the first direction 50 or the second direction 52 according to the desired emission sequence (e.g., node $t_{n+n,1}$ means that at time "n+n," the last node in row 2 will be in the light emitting state). Thus, the light 22 is emitted sequentially along the first axis 48 and then sequentially along the second axis 64, according to the illustrated embodiment. One possible advantage of this type of emission sequence is to provide an amount of vertical redundancy when reading the symbol 26, such as a symbol 26 having vertically oriented bars, which can be read at multiple, vertical locations, for example a barcode symbol.

Figure 4D:
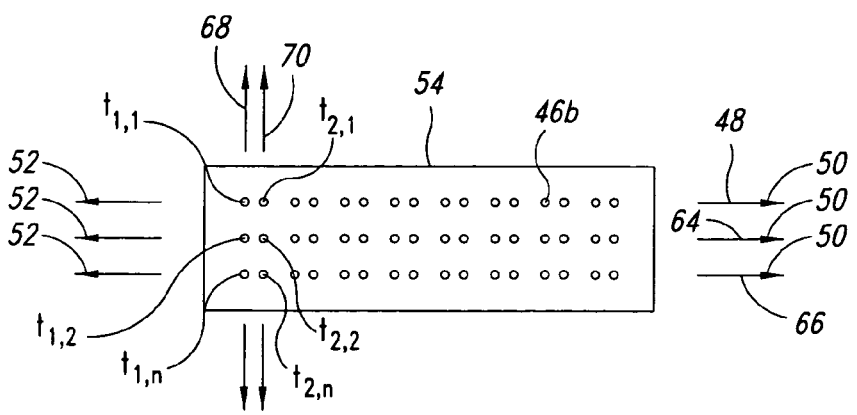

FIG. 4D shows the light emitting ends 46b generally distributed along more than two axes, for example three or more axes 48, 64, 66 (e.g., rows). Additionally or alternatively, the light emitting ends 46b can be distributed along a first column 68. In one embodiment, the light 22 is emitted from all of the light emitting ends 46b located in the first column 68 at substantially a first time. Next, the light 22 is emitted from all of the light emitting ends 46b located in the second column 70 at substantially a second time, wherein the second time is different than the first time. This exemplary emission sequence continues until the light emitting ends 46b within each respective column have been cycled to a light emitting state.

The light emitting ends 46b of the primary waveguides 46 are shown as being linearly distributed along the respective axes 48, 64, 66, but it is understood that the light emitting ends 46b can be generally distributed along each respective row and/or column axis (i.e., at least slightly offset therefrom).

It is understood that the light 22, upon reaching the surface 24, must be of an appropriate size relative to the width of the smallest bar and/or space of the symbol 26 being read. Accordingly, it is desirable if respective light emitters 46b in the respective columns 68, 70, etc., are vertically spaced such that light emitted therefrom does not vertically overlap when reaching the surface 24.

It is understood and appreciated that there are virtually limitless variations with respect to the arrangement of the primary waveguides 46 in the holder 54 and in the order and/or timing of the desired emission sequence. Thus, it is appreciated and understood that the primary waveguides 46 can be distributed in the holder 54 in any manner. It is also appreciated and understood that the desired emission sequence can cause the light 22 to be emitted in a variety of ways, as long as the light 22 is emitted in such a manner that permits the symbol reader 10 to read the symbol 26.

Additionally or alternatively, the arrangement of the light emitters 46b in the holder 54 and/or the order of desired emission sequence can be customized to read special machine-readable symbols 26, for example a Code 49 stacked symbology, a Code 13 bidirectional symbology, a La Mer Code circular symbology, or any other type of machine-readable symbol. The aforementioned symbologies and many other types of symbologies can be found in *Punched Cards to Bar Codes—A 200 Year Journey*, by Benjamin Nelson, Helmers Publishing, Inc., Peterborough, N.H., U.S.A. (1997) (ISBN 0-911261-12-5). Accordingly, the embodiments described herein are for illustrative purposes and are not meant to limit or restrict the scope of the claims. In addition, the embodiments, which include the arrangements of the primary waveguides 46 and/or the order of the desired emission sequences, described herein can be combined to provide further embodiments.

Referring back to FIG. 1, the optical sensor 18 receives at least some of the light reflected from the surface 24 when the surface 24 is illuminated by the illumination subsystem 16. The optical sensor 18 can be group of photodetectors, phototransistors, or some other optical sensor/detector. Optical sensors 18 for receiving light are well known and will not be described in further detail herein.

The focusing device 20 is arranged in the housing 12 to receive the light 22 after the light 22 has been emitted from the respective remitting ends 46b of distinct primary waveguides 46. The focusing device 20 may advantageously be a fixed focusing device, such as a fixed lens or lens assembly. Alternatively, the focusing device 20 may take the form of a movable lens or lens assembly, for example employing a screw-drive, rack and pinion drive, or a microfluidic lens assembly.

The focusing device 20 is a fixed optical lens assembly and includes one or more optical lenses or filters according to the illustrated embodiment. The optical lenses may be simple lenses or compound lenses. The lenses may be glass, optical plastic or other material.

Symbol reading and decoding technology is well known in the art and will not be discussed in further detail. Many alternatives for optical sensors, symbol decoders, and optical elements that can be used in the optical reader 10 are taught in *The Bar Code Book*, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763 filed on Sep. 21, 1999.

Figure 5A:
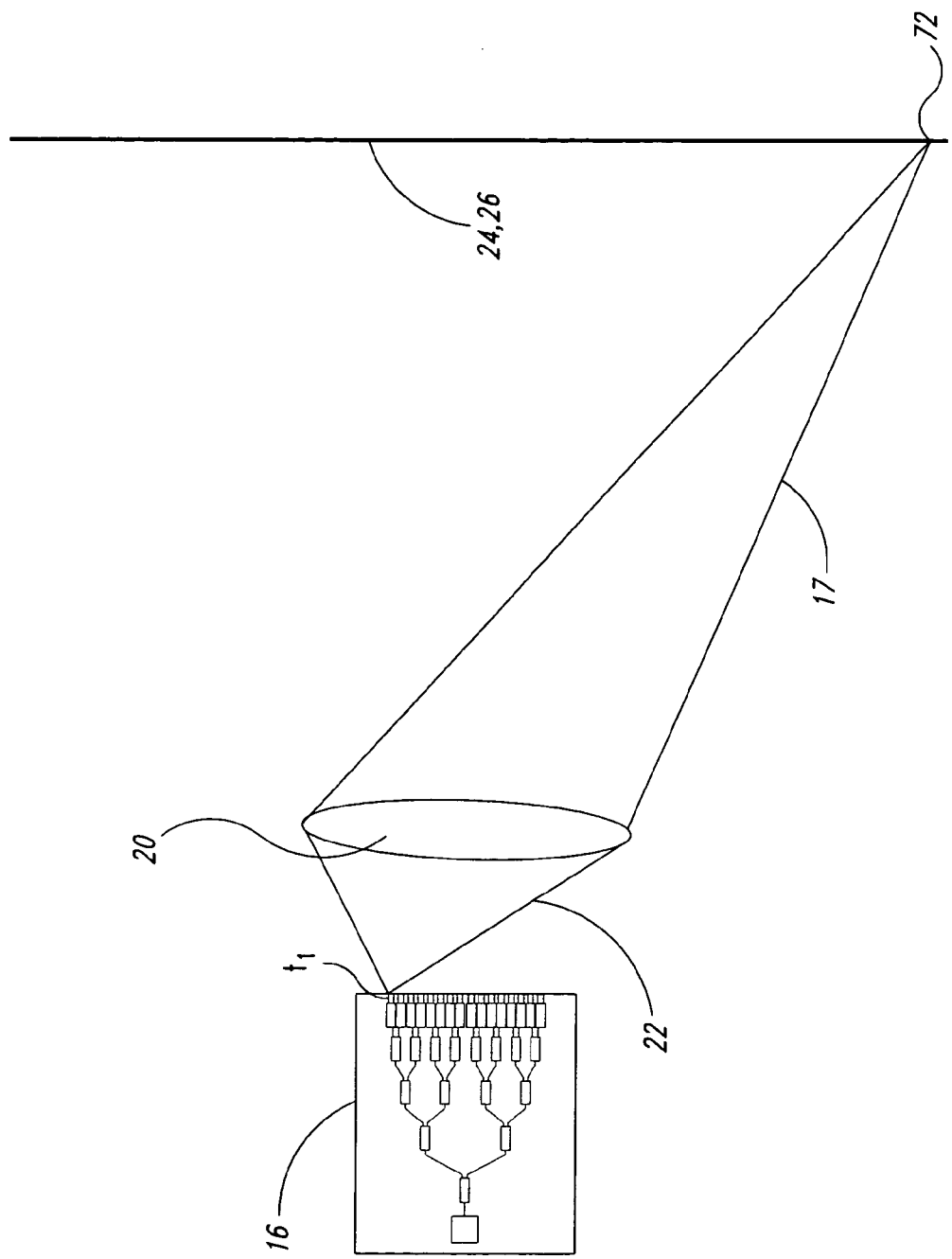
FIGS. 5A-5C are schematic diagrams of a focusing device receiving light from a number of distinct light emitters and directing the light onto a surface bearing a machine-readable symbol, according to the illustrated embodiments.
Figure 5B:
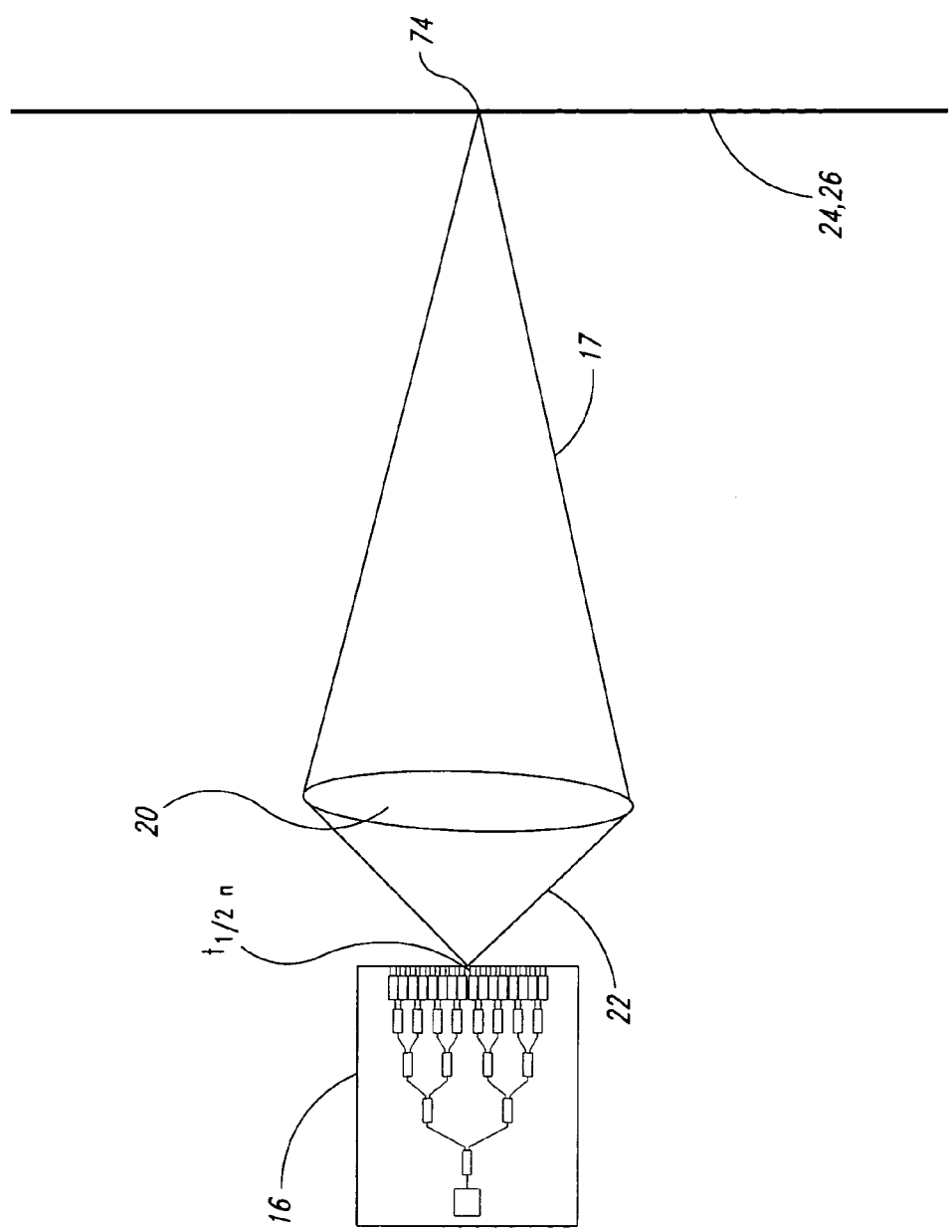
Figure 5C:
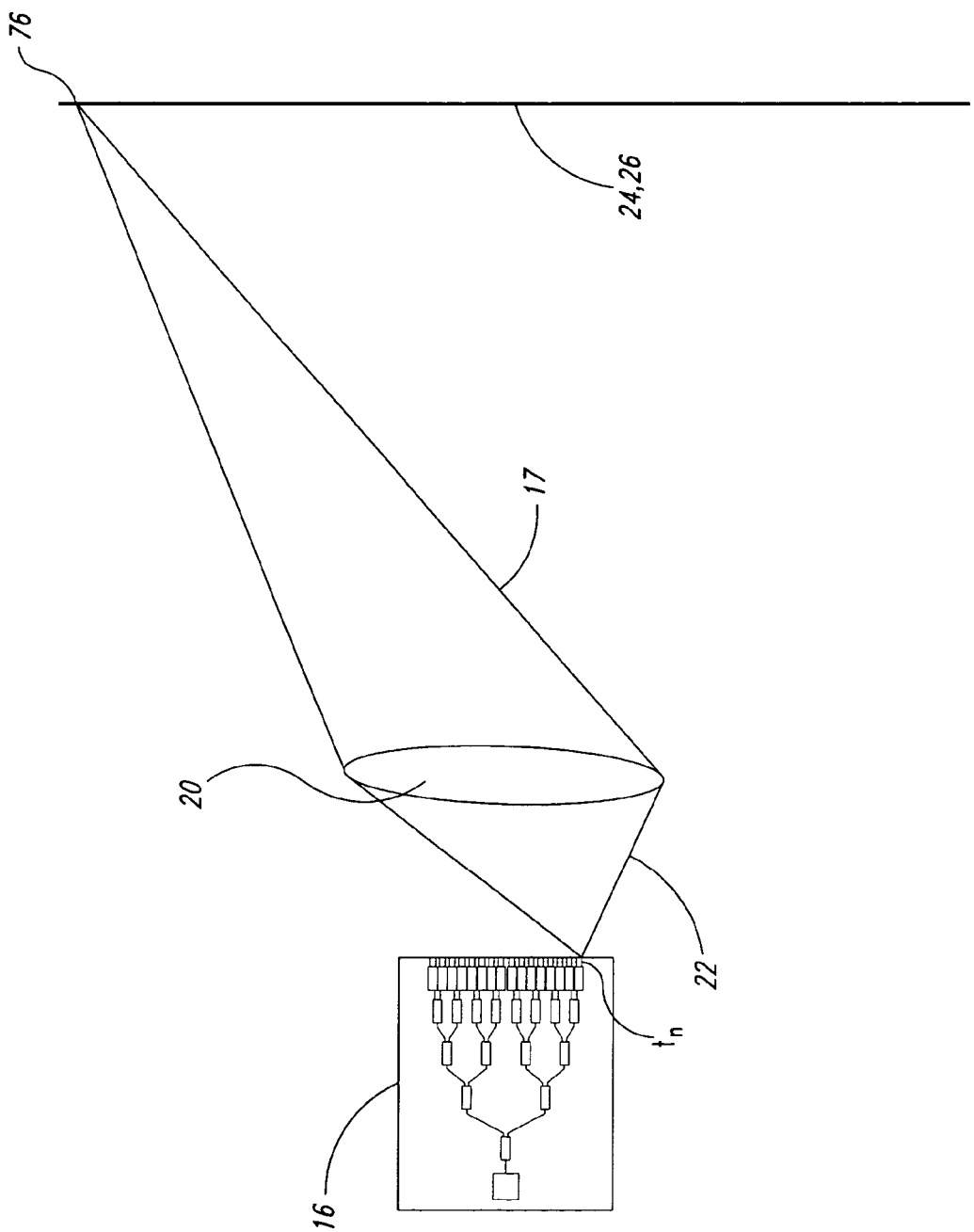

FIGS. 5A, 5B, and 5C show the light 22 being emitted from the light emitters 46b according to one desired emission sequence. For example, at time $t_1$, the light 22 is focused on a first portion 74 of the symbol 26; at time $t_{1/2n}$, the light 22 is focused on a second portion 76 of the symbol 26; and at time $t_n$, the light 22 is focused on a third portion 78 of the symbol 26.

Figure 6:
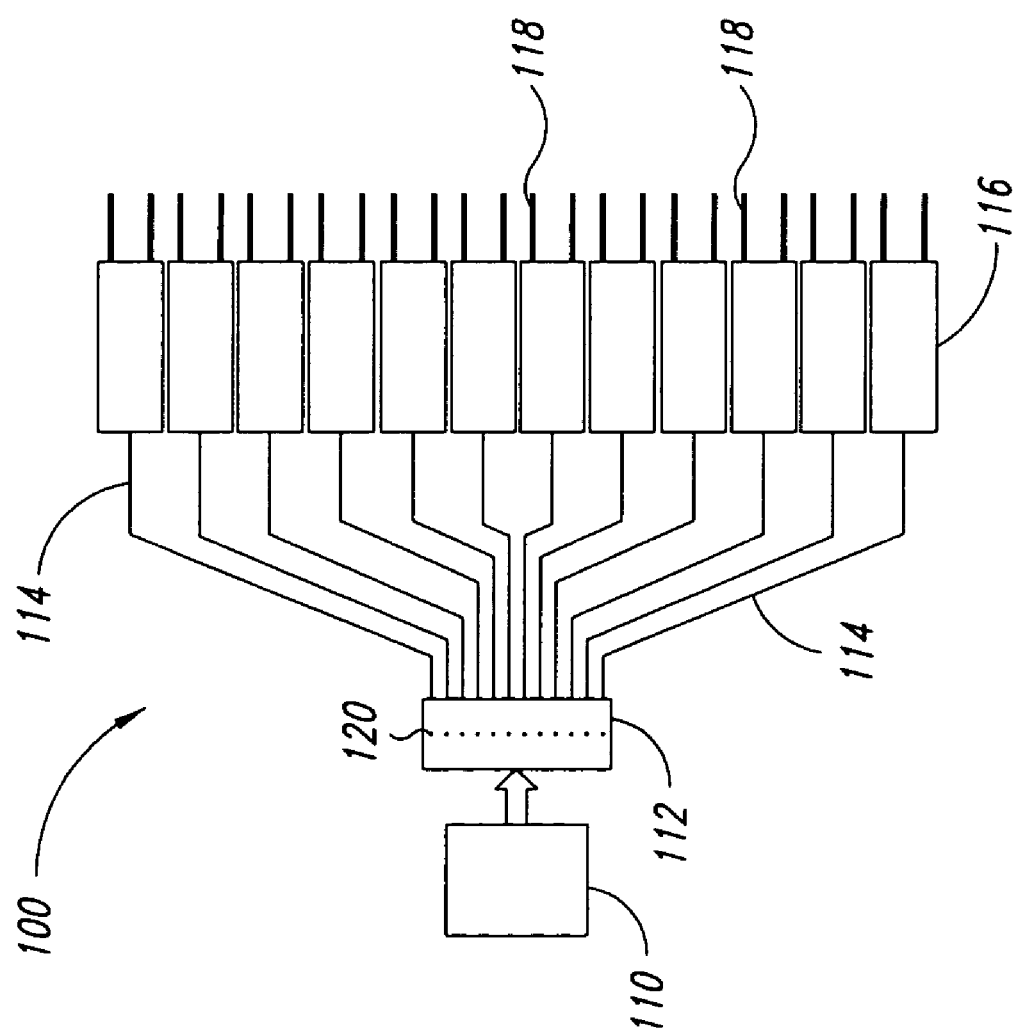
FIG. 6 is a schematic diagram of another illumination subsystem with a controllable light source and a plurality of distinct light emitters, according to one illustrated embodiment.

FIG. 6 shows an illumination subsystem 100 coupled to a control subsystem 110 having a light source 112 disposed therebetween. The illumination subsystem 100 is comprised of a plurality of intermediate waveguides 114, a plurality of optical switches 116, and a plurality of primary waveguides 118.

The light source 112 is comprised of one or more LEDs 120, each of which may be controlled by the control subsystem 110. In one embodiment, the control subsystem 110 includes a timer to send commands to oscillate the LEDs 120 (i.e., repeatedly turn the individual LEDs 120 either ON or OFF). The timer may be an on-chip timer or clock or an off-chip timer or clock. As described in the previous embodiments, the light is directed through the intermediate waveguides 114 and optical switches 116 and is eventually emitted from the plurality of primary waveguides 118 according to a desired emission sequence.

Possible Advantages of a Machine-Readable Symbol Reader Configured with an Illumination Subsystem One possible advantage is that the symbol reader may omit moving parts, such as moving mirrors to focus and/or direct the light emitted from the reader, at least according to one of the embodiments herein. Accordingly, the robustness, reliability, and longevity of the symbol reader is increased while the complexity associated with the assembly of the reader is decreased, especially when compared with conventional scanners that have internal electromechanical beam deflection systems to automatically move the beam back and forth across the symbol.

Another advantage of the symbol reader is that the integrated optical and fiber optic components permits the overall size of the symbol reader to be quite small. For example, one type of EA modulator, which was provided as an exemplary embodiment above, takes up an envelope of space of about $21 \times 13 \times 11$ mm$^3$. Another type of EA modulator takes up an envelope of space of about $250 \times 200 \times 80$ μm$^3$.

Yet another advantage of the symbol reader is that the light emitted from the light emitters may be at least as bright as a conventional scanner.

Yet another advantage of the symbol reader is that the light source can be a laser, thus providing the symbol reader with a large depth-of-field.

The various embodiments described above can be combined to provide further embodiments. All of the above U.S. patents, patent applications and publications referred to in this specification including U.S. Pat. No. 6,286,763 filed on Sep. 21, 1999; and U.S. Pat. No. 6,618,162 filed on Jan. 26, 1999 are incorporated herein by reference. Aspects of the various embodiments can be modified, if necessary, to employ devices, features, and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all optical scanning and/or reading devices that operate in accordance with the claims. Accordingly, the invention is not limited by the disclosure, but instead its scope is to be determined entirely by the following claims.

What is claimed is:

1. A machine-readable symbol reader for reading machine-readable symbols, the machine-readable symbol reader comprising:

a housing;

at least one transducer coupled to the housing and operable to produce light;

an illumination network comprising a plurality of primary waveguides supported by the housing, each of the primary waveguides comprising a light receiving end and a light emitting end, the light receiving ends coupled to selectively receive light from the at least one transducer, the light emitting ends generally arranged along at least a first axis and positioned to selectively emit light from the housing;

a control subsystem coupled to cause the light emitting ends to emit light in a desired emission sequence;

a focusing lens to focus the emitted light; and
an optical sensor positioned with respect to the light emitting ends to receive at least a portion of the light that is returned from a surface illuminated by the emitted light.

2. The machine-readable symbol reader of claim 1 wherein the at least one transducer is a semiconductor laser.

3. The machine-readable symbol reader of claim 1 wherein the at least one transducer is a light emitting diode.

4. The machine-readable symbol reader of claim 1 wherein at least some of the plurality of light emitting ends generally arranged along the first axis are offset perpendicularly from the first axis.

5. The machine-readable symbol reader of claim 1 wherein the plurality of light emitting ends are also generally arranged along a second axis and positioned to selectively emit light from the housing, wherein the second axis is perpendicular to the first axis.

6. The machine-readable symbol reader of claim 1 wherein the plurality of light emitting ends are distributed in a two-dimensional array.

7. The machine-readable symbol reader of claim 6 wherein the light emitting ends are distributed in the two-dimensional array in a number of rows extending generally parallel to the first axis, the light emitting ends in each row being staggered with respect to the light emitting ends in an adjacent row.

8. The machine-readable symbol reader of claim 1 wherein the illumination network further comprises a number intermediate waveguides and a number of optical switches coupling the at least one transducer to the light receiving ends of the primary waveguides.

9. The machine-readable symbol reader of claim 8 wherein the number of light emitting ends is equivalent to the number of transducers.

10. The machine-readable symbol reader of claim 8 wherein the control subsystem is coupled to control the optical switches.

11. The machine-readable symbol reader of claim 10 wherein the control subsystem includes at least one controller configurable to control the optical switches to produce the desired emission sequence.

12. The machine-readable symbol reader of claim 1, further comprising:
a holder coupled to the housing, the holder fixably receiving each of the primary waveguides proximate the light emitting ends thereof.

13. The machine-readable symbol reader of claim 1 wherein the transducer is operable to produce light in at least one of a visible portion, an ultraviolet portion or an infrared portion of an electromagnetic spectrum.

14. A machine-readable symbol reader for reading machine-readable symbols, the machine-readable symbol reader comprising:
at least one transducer operable to produce light;
an illumination network comprising a plurality of primary waveguides, a number of intermediary waveguides, and a number of optical switches, each of the primary waveguides comprising a light receiving end and a light emitting end, the light receiving ends of the primary waveguides coupled by at least some of the intermediate waveguides and the optical switches to selectively receive light from the at least one transducer, the light emitting ends of the primary waveguides generally arranged along at least a first axis and positioned to selectively emit light in a first direction toward a surface to be illuminated;
a control subsystem coupled to electrically control the number of optical switches to cause the light emitting ends to emit light in a desired emission sequence;
a focusing lens to focus the emitted light; and
at least one optical sensor positioned with respect to the light emitting ends to receive at least a portion of light returned from the illuminated surface.

15. The machine-readable symbol reader of claim 14 wherein the light emitting ends are positioned to form a linear array.

16. The machine-readable symbol reader of claim 14 wherein at least some of the light emitting ends are positioned along a second axis that is substantially perpendicular to the first axis to form a two-dimensional array.

17. The machine-readable symbol reader of claim 16 wherein the two-dimensional array comprises a number of rows of light emitting ends, each row approximately parallel to the first axis, and the light emitting ends of a one row of the two-dimensional array are offset along the first axis with respect to the light emitting ends of another row of the two-dimensional array.

18. The machine-readable symbol reader of claim 14 wherein the intermediate waveguides include at least a first stage of intermediate waveguides and a second stage of intermediate waveguides, the first stage of intermediate waveguides each comprising a light receiving end positioned proximate the transducer and a light emitting end positioned distal to the transducer, the second stage intermediate waveguides each comprising a light receiving end and a light emitting end, the second stage of intermediate waveguides communicatively coupled between the light emitting ends of the first stage of intermediate waveguides and the light receiving ends of the primary waveguides.

19. The machine-readable symbol reader of claim 18 wherein the light emitting end of each of the first stage intermediate waveguides is communicatively coupled to the light receiving ends of at least two of the primary waveguides by at least a respective one of the optical switches.

20. The machine-readable symbol reader of claim 14 wherein the intermediate waveguides include at least a first stage of intermediate waveguides, a second stage of intermediate waveguides, and a third stage of intermediate waveguides, the first stage of intermediate waveguides each having a light receiving end positioned proximate the transducer and a light emitting end positioned distal to the transducer, the second and third stage intermediate waveguides each comprising a light receiving end and a light emitting end, the second stage of intermediate waveguides communicatively coupled between the light emitting ends of the first stage of intermediate waveguides and the light receiving ends of the third stage intermediate waveguides, and the third sage of intermediate waveguides communicatively coupled between the light emitting ends of the second stage intermediate waveguides and the light receiving ends of the primary waveguides.

21. A machine-readable symbol reader, comprising:
light generating means for generating light;
illumination network means comprising at least a light emitting means for emitting the light from the reader; the illumination network means for selectively routing light from the light generating means to the light emitting means, wherein the illumination network means comprises at least a plurality of primary waveguides and wherein the light emitting means comprises a plurality of light emitting ends, each light emitting end corresponding to one of the primary waveguides;

control means for controlling the illumination network means to cause the light emitting means to emit light in a controlled emission sequence along at least a first axis; and light detector means for detecting at least some of the emitted light reflected from a surface.

22. The symbol reader of claim 21 wherein the light generating means is one of a laser source or an light emitting diode.

23. The symbol reader of claim 21 wherein the number of light emitting means is greater than a number of distinct light sources comprising the light generating means.

24. The symbol reader of claim 21 wherein the illumination network means further comprises a number of intermediate waveguides and a number of optical switches, the number of optical switches selectively, communicatively coupling the intermediate waveguides with the primary waveguides, wherein the optical switches are controlled by the control means.

25. The symbol reader of claim 21 wherein the control means comprises a controller configured to cause the light emitting means to sequentially illuminate in at least one direction along the first axis.

26. The symbol reader of claim 21 wherein the control means comprises a controller configured to cause the light emitting means to sequentially illuminate in at least one direction along the first axis and in at least one direction along a second axis, wherein the second axis is substantially perpendicular to the first axis.

27. A method of operating a machine-readable symbol reader comprising at least one transducer to produce light, a plurality of light emitters positioned to emit light from the machine-readable symbol reader, an illumination network comprising waveguides and optical switches to selectively direct light from the at least one transducer to the plurality of light emitters, and a control subsystem to control the illumination network, the method comprising:

providing control signals from the control subsystem to the optical switches to route light from the at least one transducer to the plurality of light emitters to cause the plurality of light emitters to emit light in a scanning sequence; and receiving at least a portion of the emitted light that is reflected from a surface.

28. The method of claim 27, further comprising:
demodulating the reflected light to obtain information from the reflected light.

29. The method of claim 27 wherein providing control signals from the control subsystem to the optical switches comprises providing control signals to each of the optical switches to set a state for each optical switch to selectively transmit light to at least some of the plurality of light emitters.

30. The method of claim 27 wherein providing control signals from the control subsystem to the optical switches comprises providing control signals to each of the optical switches to set a state for each optical switch to cause each of the plurality of light emitters to sequentially emit light.

31. The method of claim 30 wherein providing control signals to each of the optical switches to set a state for each optical switch to cause each of a number of the light emitters to sequentially emit light includes causing the plurality of light emitters to sequentially emit light in a sequence that progresses in a first direction.

32. The method of claim 30 wherein providing control signals to each of the optical switches to set a state for each optical switch to cause each of the plurality of light emitters to sequentially emit light comprises causing the plurality of light emitters to sequentially emit light in a sequence that progresses in a first direction along a first axis followed by a sequence that progresses in a second direction along the first axis, the second direction opposed to the first direction.

33. The method of claim 27 wherein the plurality of light emitters are arranged in a two-dimensional array of rows and columns, and wherein providing control signals from the control subsystem to the optical switches comprises providing control signals to each of the optical switches to set a state for each optical switch to sequentially transmit light to the at least one of the plurality of light emitters in each column.

34. The method of claim 33 wherein providing control signals to each of the optical switches to set a state for each optical switch to sequentially transmit light to the at least one of the plurality of light emitters in each column includes simultaneously transmitting light from all of the light emitters located in a first column.

35. The method of claim 30 wherein providing control signals to each of the optical switches to set a state for each optical switch to cause each of the plurality of light emitters to sequentially emit light includes the plurality of light emitters arranged along a first axis.

* * * * *